United States Patent
Yoon et al.

(10) Patent No.: US 11,914,143 B2
(45) Date of Patent: Feb. 27, 2024

(54) IMMERSIVE AUGMENTED REALITY HEAD-UP DISPLAY APPARATUS

(71) Applicant: KOREA PHOTONICS TECHNOLOGY INSTITUTE, Gwangju (KR)

(72) Inventors: Seonkyu Yoon, Gwangju (KR); Sungkuk Chun, Gwangju (KR); Kwanghoon Lee, Gwangju (KR)

( * ) Notice: Subject to any disclaimer, the term of this patent is extended or adjusted under 35 U.S.C. 154(b) by 20 days.

(21) Appl. No.: 16/719,981

(22) Filed: Dec. 19, 2019

(65) Prior Publication Data
US 2021/0191115 A1    Jun. 24, 2021

(51) Int. Cl.
*G02B 27/01* (2006.01)
*G02B 27/42* (2006.01)
*G02B 27/28* (2006.01)

(52) U.S. Cl.
CPC ....... *G02B 27/0101* (2013.01); *G02B 27/288* (2013.01); *G02B 27/4205* (2013.01)

(58) Field of Classification Search
CPC .............. G02B 27/0101; G02B 27/288; G02B 27/4205

USPC .................................................. 359/485.01
See application file for complete search history.

(56) References Cited

U.S. PATENT DOCUMENTS

| 2011/0037951 A1* | 2/2011 | Hua | G02B 13/04 353/20 |
| 2012/0069413 A1* | 3/2012 | Schultz | G02B 27/0101 359/240 |

\* cited by examiner

*Primary Examiner* — Wyatt A Stoffa
*Assistant Examiner* — Mitchell T Oestreich
(74) *Attorney, Agent, or Firm* — ANTONIO HA & U.S. PATENT, LLC

(57) ABSTRACT

An augmented reality device includes an image output unit disposed at a preset angle from a horizontal direction to output an augmented reality image of a preset polarization direction, a polarization reflection film reflecting light of the preset polarization direction and transmitting other light than the light of the preset polarization direction, and an optical component disposed on a light path of an image output from the image output unit. The optical component has a preset refractive index and a preset shape. The polarization reflection film is applied on a first surface of the optical component which is positioned farther away from the image output unit.

9 Claims, 5 Drawing Sheets

IMMERSIVE AUGMENTED REALITY HEAD-UP DISPLAY APPARATUS

TECHNICAL FIELD

Embodiments of the disclosure relate to immersive augmented reality head-up display apparatus.

DESCRIPTION OF RELATED ART

The description of the Discussion of Related Art section merely provides information that may be relevant to embodiments of the disclosure but should not be appreciated as necessarily constituting the prior art.

A head-up display or heads-up display, also known as a HUD, is any transparent display that presents data without requiring users to look away from their usual viewpoints. The origin of the name stems from a pilot being able to view information with the head positioned "up" and looking forward, instead of angled down looking at lower instruments. A HUD also has the advantage that the pilot's eyes do not need to refocus to view the outside after looking at the optically nearer instruments. HUDs are in wide use in various industry sectors, as well as in transportations.

HUDs output images ahead of the user, so that other people around the user may also see the images. Further, people positioned behind the images, and opposite the user, are subjected to expose of very intense light from the images, which may be very harmful. For those or other various reasons, conventional HUDs may be inappropriate for daily home uses. Thus, there have been various research and development efforts to provide virtual reality apparatus that may be worn on the user's eye(s) to block real-world light from the outside while providing only augmented reality images to the user.

SUMMARY

An object of the disclosure is to provide an immersive augmented reality head-up display apparatus capable of providing augmented reality images to a user who maintains a predetermined posture.

An object of the disclosure is to provide an immersive augmented reality head-up display apparatus that may minimize exposure of augmented reality images to the outside while protecting other peoples around the user.

According to an embodiment, an augmented reality device includes an image output unit disposed at a preset angle from a horizontal direction to output an augmented reality image of a preset polarization direction, a polarization reflection film reflecting light of the preset polarization direction and transmitting other light than the light of the preset polarization direction, and an optical component disposed on a light path of an image output from the image output unit. The optical component has a preset refractive index and a preset shape. The polarization reflection film is applied on a first surface of the optical component which is positioned farther away from the image output unit.

The polarization reflection film may be disposed at an angle at which the reflected light is incident to a user's eye.

The augmented reality image output from the image output unit may be reflected by the polarization reflection film to a user's eye.

Light emitted towards the first surface of the optical component may be incident to the polarization reflection film, and at least part of the light with other polarization directions than the preset polarization direction may pass through the polarization reflection film and the optical component to a user's eye.

According to an embodiment, an augmented reality device includes an image output unit disposed at a preset angle from a horizontal direction to output an augmented reality image of a preset polarization direction, a diffraction optical element reflecting light emitted from the image output unit, a polarization reflection film reflecting light of the preset polarization direction and transmitting other light than the light of the preset polarization direction, and an optical component disposed on a light path of an image reflected by the diffraction optical element. The optical component has a preset refractive index and a preset shape. The polarization reflection film is applied on a first surface of the optical component which is positioned farther away from the image output unit.

The polarization reflection film may be disposed at an angle at which the reflected light is incident to a user's eye.

The augmented reality image output from the image output unit may be reflected by the polarization reflection film to a user's eye.

Light emitted towards the first surface of the optical component may be incident to the polarization reflection film, and at least part of the light with other polarization directions than the preset polarization direction may pass through the polarization reflection film and the optical component to a user's eye.

As described above, according to an embodiment, the user may view augmented reality images while maintaining a predetermined posture without the need for changing his posture to view the augmented reality images.

Further, according to an embodiment, exposure, to the outside, of augmented reality images may be minimized, thus protecting the user's privacy while preventing eye injury or damage to other people around the user.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein.

DETAILED DESCRIPTION OF EXEMPLARY EMBODIMENTS

Various changes may be made to the disclosure, and the disclosure may come with a diversity of embodiments.

Some embodiments of the disclosure are shown and described in connection with the drawings. However, it should be appreciated that the disclosure is not limited to the embodiments, and all changes and/or equivalents or replacements thereto also belong to the scope of the disclosure. Similar reference denotations are used to refer to similar elements throughout the drawings.

The terms "first" and "second" may be used to describe various components, but the components should not be limited by the terms. The terms are used to distinguish one component from another. For example, a first component may be denoted a second component, and vice versa without departing from the scope of the disclosure. The term "and/or" may denote a combination(s) of a plurality of related items as listed or any of the items.

It will be understood that when an element or layer is referred to as being "on," "connected to," "coupled to," or "adjacent to" another element or layer, it can be directly on, connected, coupled, or adjacent to the other element or layer, or intervening elements or layers may be present. In contrast, when a component is "directly connected to" or "directly coupled to" another component, no other intervening components may intervene therebetween.

The terms as used herein are provided merely to describe some embodiments thereof, but not to limit the disclosure. As used herein, the singular forms "a," "an," and "the" are intended to include the plural forms as well, unless the context clearly indicates otherwise. As used herein, the term "comprise," "include," or "have" should be appreciated not to preclude the presence or addability of features, numbers, steps, operations, components, parts, or combinations thereof as set forth herein.

Unless otherwise defined, all terms including technical and scientific terms used herein have the same meaning as commonly understood by one of ordinary skill in the art to which the embodiments of the disclosure belong.

It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The components, processes, steps, or methods according to embodiments of the disclosure may be shared as long as they do not technically conflict with each other.

Figure 1:
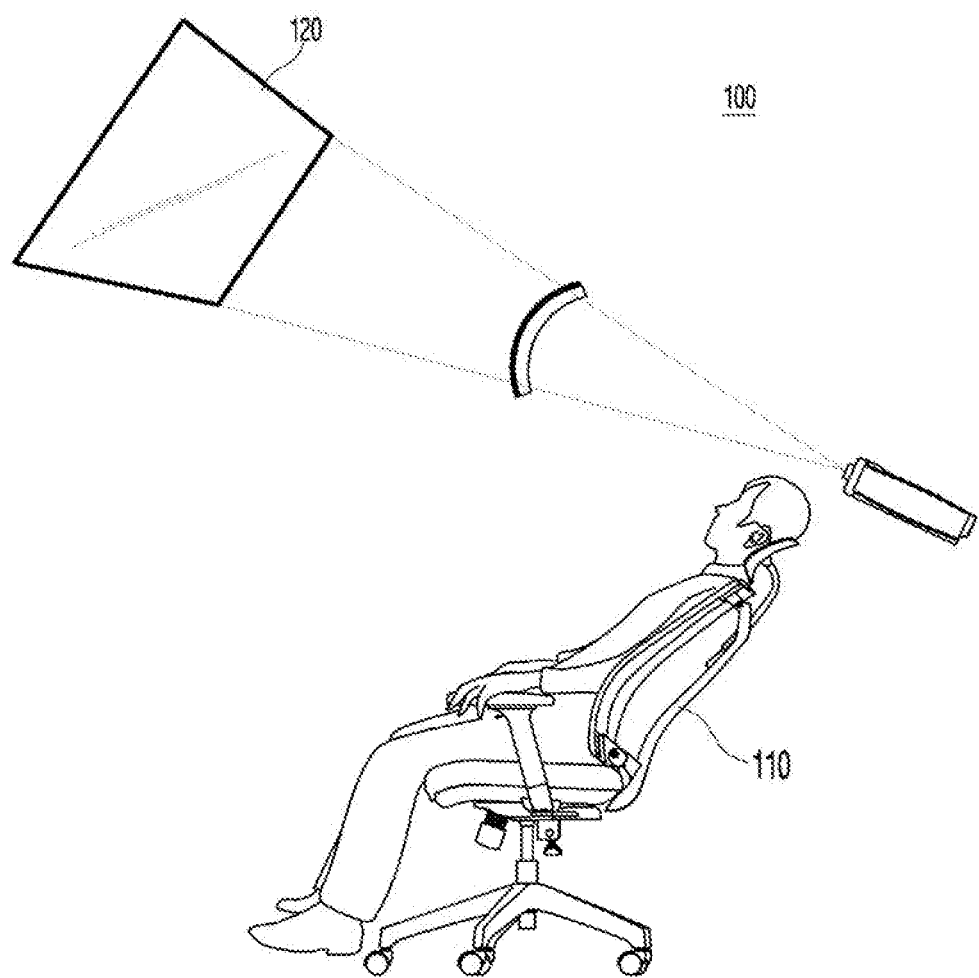
FIG. 1 is a view illustrating an example of an immersive augmented reality head-up display according to an embodiment of the disclosure.

FIG. 1 is a view illustrating an example of an immersive augmented reality head-up display according to an embodiment of the disclosure.

Referring to FIG. 1, an immersive augmented reality head-up display 100 provides an augmented reality image 120 to a user 110 at a predetermined angle from the horizontal direction.

The user 110 may be in a position of sitting, inclined at a preset angle, on, e.g., a recliner, massage chair, or angle-adjustable bed. When the user 110 is in such a position, the immersive augmented reality head-up display 100 (also simply referred to herein as an 'augmented reality device') allows the user 110 to view the augmented reality image 120 comfortably without the need for wearing a separate device while preventing others positioned in different directions from the user 110 from viewing the augmented reality image 120. As such, the user 110 may enjoy the augmented reality image 120 conveniently even in an inclined or leaning position using the augmented reality device 100.

Figure 2:
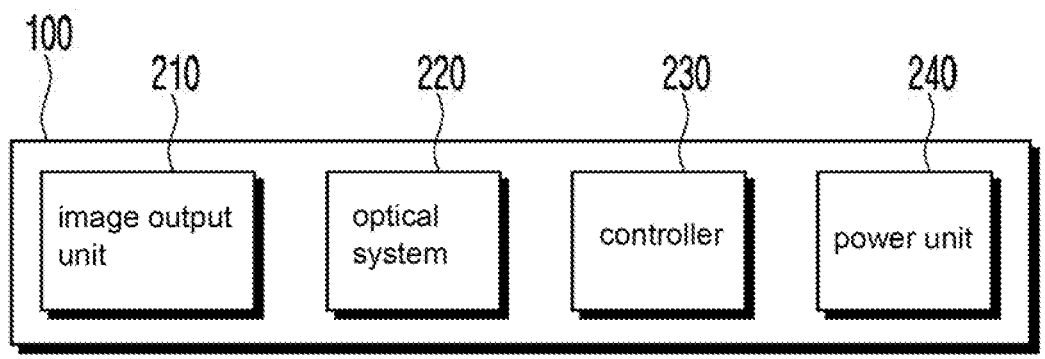
FIG. 2 is a block diagram illustrating a configuration of an immersive augmented reality head-up display apparatus according to an embodiment of the disclosure.

FIG. 2 is a block diagram illustrating a configuration of an immersive augmented reality head-up display apparatus according to an embodiment.

Referring to FIG. 2, according to an embodiment of the disclosure, an augmented reality device 100 includes an image output unit 210, an optical system 220, a controller 230, and a power unit 240.

The image output unit 210 outputs an augmented reality image that is to be provided to the user 110. The image output unit 210 may receive an augmented reality image from an external component (not shown) via wired or wireless communication and output the received image to the outside of the augmented reality device 100. The image output unit 210 may output the augmented reality image to have only a preset polarization direction. The image output unit 210 may output the augmented reality image with the preset polarization direction, thereby allowing the augmented reality image to enter the user's eyes via the optical system 220.

The optical system 220 may transmit real-world light (light reflected by a real-world object) coming from the outside of the augmented reality device 100 but reflect the augmented reality image to the user's eyes so that the user may recognize both the real-world light and the augmented reality image. The optical system 220 may differentiate between polarization directions of incident light and may thus reflect light with the preset polarization direction while transmitting light with the other polarization directions. As such, the optical system 220 may determine whether to transmit or reflect light incident in a polarization direction, thereby providing both the augmented reality image and the real-world light while minimizing exposure of the augmented reality image to the outside. The optical system 220 is described below in detail with reference to FIGS. 3 and 4.

The controller 230 controls the operation of the image output unit 210 and the power unit 240.

The power unit 240 supplies power to each component of the augmented reality device 100 so that the components may operate.

Figure 3:
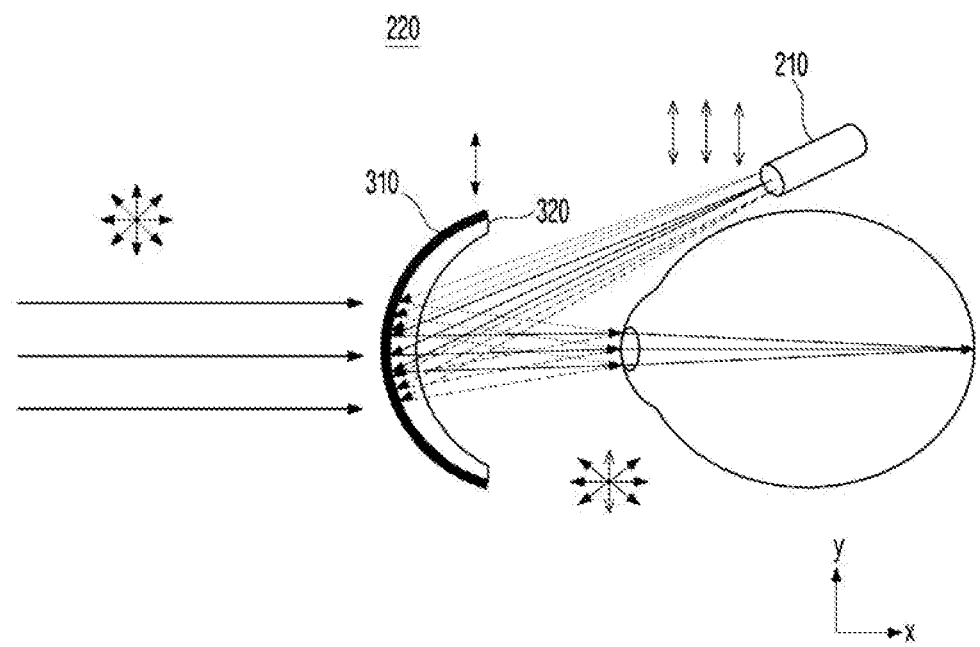
FIG. 3 is a view illustrating a configuration of an optical system according to an embodiment of the disclosure.

FIG. 3 is a view illustrating a configuration of an optical system according to an embodiment of the disclosure.

Referring to FIG. 3, according to an embodiment, an optical system 220 includes a polarization reflection film 310 and a lens 320.

The polarization reflection film 310 is applied to one surface of the lens 320 to reflect a preset polarization direction (e.g., the y axis direction of FIG. 3) of light rays incident onto the lens 320 while transmitting other polarization directions of the light rays. The polarization reflection film 310 may be applied to one surface of the lens 320, e.g., the surface of the lens 320, which is farther away from the user's eye along the −x axis direction, to reflect or transmit light incident to the lens 320. Real-world light entering the lens 320 from the outside of the augmented reality device 110 (e.g., light incident onto the surface of the lens 320, which is farther away from the user's eye), has a non-polarization direction, rather than having a specific polarization direction, unless manipulated otherwise. As such, light rays with the non-polarization direction, entering the lens 320, first strike the polarization reflection film 310 so that light rays with the preset polarization direction are reflected while light rays with the other polarization directions pass through the polarization reflection film 310. In contrast, the augmented reality image output from the image output unit 210 is incident to one surface of the lens 320, which is closer to the user's eye. The augmented reality image passes through the lens 320 and then strikes the polarization reflection film 310. As described above, since the augmented reality image has the preset polarization direction, the augmented reality image is fully reflected by the polarization reflection film 310. As such, as the polarization reflection film 310 is applied on the surface of the lens 320, which is farther away from the user's eye, the following effects are produced. Of real-world light entering the lens 320 from the outside of the augmented reality device 110, only a light component with the preset polarization direction is reflected, and the other light components all pass through the polarization reflection film 310, then through the lens 320, to the user's eye. Thus, the loss of the real-world light is minimized. Since the light component with the preset polarization direction of the real-world light is removed by the polarization reflection film 310, no interference would occur between the real-world light and the augmented reality image. Since the augmented reality image with the preset polarization direction is wholly reflected by the polarization reflection film 310, the augmented reality image does not travel in other directions than the direction of reflection by the polarization reflection film 310. Thus, other people positioned in other directions from the user wearing the augmented reality device 100 cannot see the augmented reality image and, thus, the user's privacy may be protected. Further, the augmented reality device 100 may prevent the other people from sudden exposure to the light emitted from the augmented reality device 100.

The polarization reflection film 310 may be implemented as a wire grid polarizer (WGP) that may determine whether to transmit or reflect light depending on the polarization direction of the light.

The lens 320 is disposed on the light path along which the image output unit 210 outputs the augmented reality image, allowing the real-world light or augmented reality image to enter the user's eye. The lens 320 changes the light path so that the user with a preset reference vision or less may wholly recognize the real-world light or augmented reality image. The lens 320 may be a lens of the glasses the user wears or may be a lens with the same optical power as the lens of the glasses, allowing the user 110 to view the augmented reality image with or without his glasses on. The real-world light incident to one surface of the lens 320, which is positioned farther away from the user's eye passes through the polarization reflection film 310 and, as collimated light, strikes the lens 320, then is refracted by the lens 320 to the light path along which the user may wholly recognize the light and then enters the user's eye. In contrast, unlike the real-world light, the augmented reality image output from the image output unit 210 is incident to the surface of the lens 320, which is closer to the user's eye and, thus, the augmented reality image goes through the lens 320 before reflected by the polarization reflection film 310. After going through the lens 320, the augmented reality image is wholly reflected by the polarization reflection film 310 and again goes through the lens 320 to the user's eye. As such, unlike the real-world light, the augmented reality image, before striking the user's eye, passes through the lens 320 two times. Thus, for the augmented reality image, it may be required to consider the light path. This is shown in FIG. 4.

Figure 4:
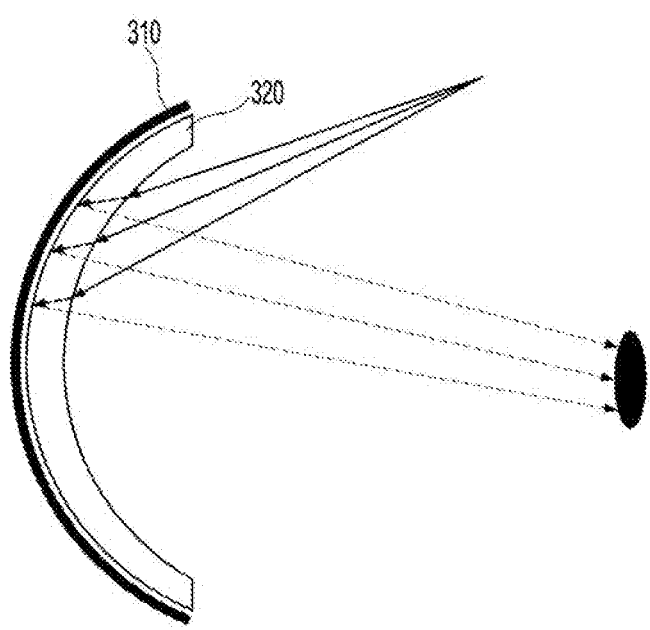
FIG. 4 is a view illustrating an example in which an augmented reality image passes through an optical system to the user's eye according to an embodiment of the disclosure.

FIG. 4 is a view illustrating an example in which an augmented reality image passes through an optical system to the user's eye according to an embodiment.

Referring to FIG. 4, light rays of the augmented reality image output from the image output unit are scattered and enter the lens 320. To minimize foreignness of the augmented reality image from the real-world light, the augmented reality image passing through the lens 320 needs to be in the form of collimated light. While passing through the lens 320, the augmented reality image is converted into collimated light that is then reflected by the polarization reflection film 310 and again passes through the lens 320 to the user's eye. In other words, in outputting an image to the lens 320 disposed on the path of light the image output unit emits, the image output unit 210 emits light so that the light may be refracted in the form of collimated light while passing through the lens 320. The lens 320 on which the polarization reflection film 310 is applied is disposed at an angle at which the augmented reality image on the light path is reflected by the polarization reflection film 310 to the user's eye, thereby minimizing exposure of the augmented reality image.

Thus, the real-world light strikes one surface of the lens 320, which is positioned farther away from the user's eye, and passes through the polarization reflection film 310 and the lens 320 wholly to the user's eye, and the augmented reality image is mostly allowed to enter the user's eye by the polarization reflection film 310 and the lens 320 so that the user may recognize the augmented reality.

The lens in the optical system 220 of the augmented reality device 100 has a predetermined optical power to provide a whole image to the user with a preset reference value of vision or less. However, embodiments of the disclosure are not limited thereto. For example, the augmented reality device 100 may also be used for anyone who has a normal vision of the preset reference value or more. A lens is included in the optical system 220. The lens has no optical power, thus allowing real-world light and augmented reality image to enter the user's eye without refraction. As the lens with no optical power is included, users with a normal vision may view augmented reality images, without exposure to the outside, using the augmented reality device 100.

Figure 5:
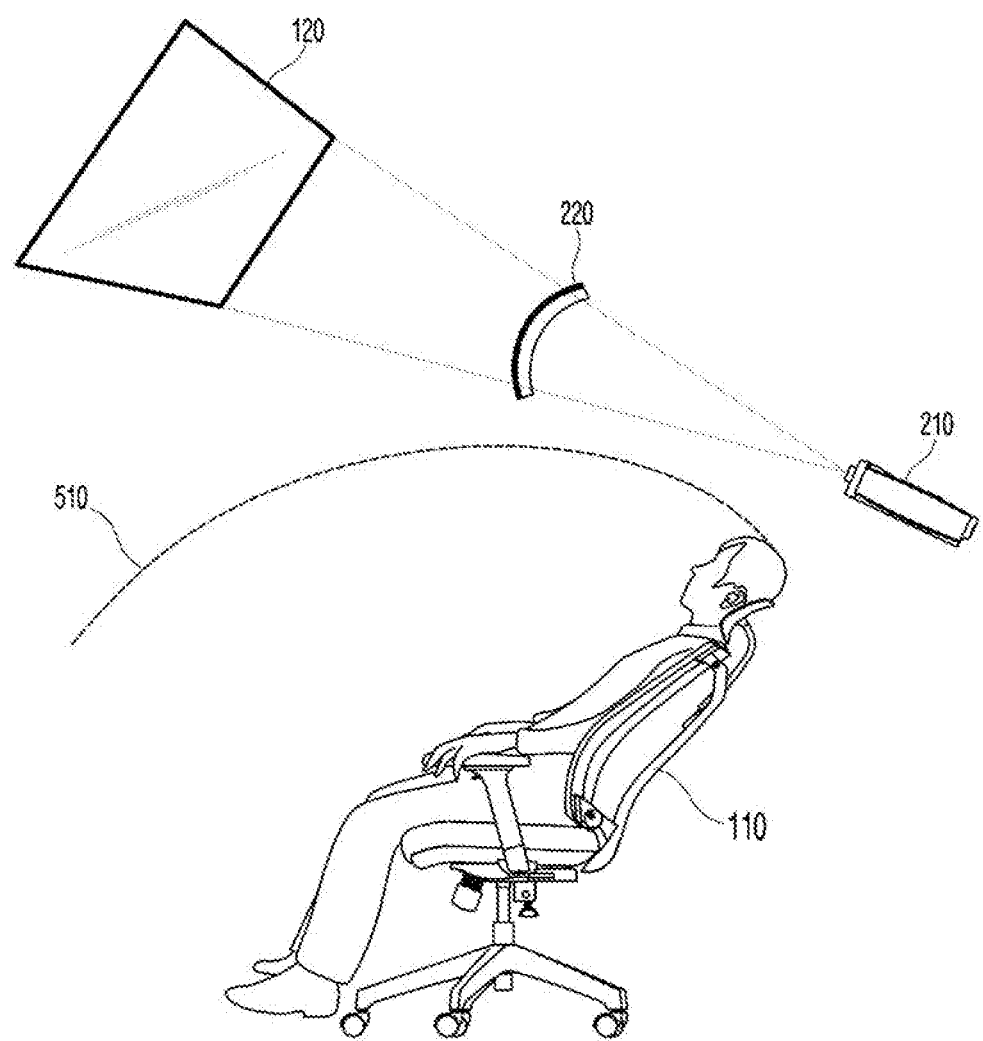
FIG. 5 is an example illustrating an example of installation of an immersive augmented reality head-up display apparatus according to an embodiment of the disclosure.

FIG. 5 is an example illustrating an example of installation of an immersive augmented reality head-up display apparatus according to an embodiment.

The user 110 may be in a position of sitting, inclined at a preset angle, on, e.g., a recliner, massage chair, or angle-adjustable bed. The image output unit 210 outputs an augmented reality image at a predetermined angle from the horizontal direction. The user 110 may adjust the angle so that the image output unit 210 outputs the image not to pass through the trajectory 510 along which the user 110 may move. Likewise, the optical system 220 is disposed away from the trajectory 510, providing the augmented reality image to the user without obstructing the user's movement.

Figure 6:
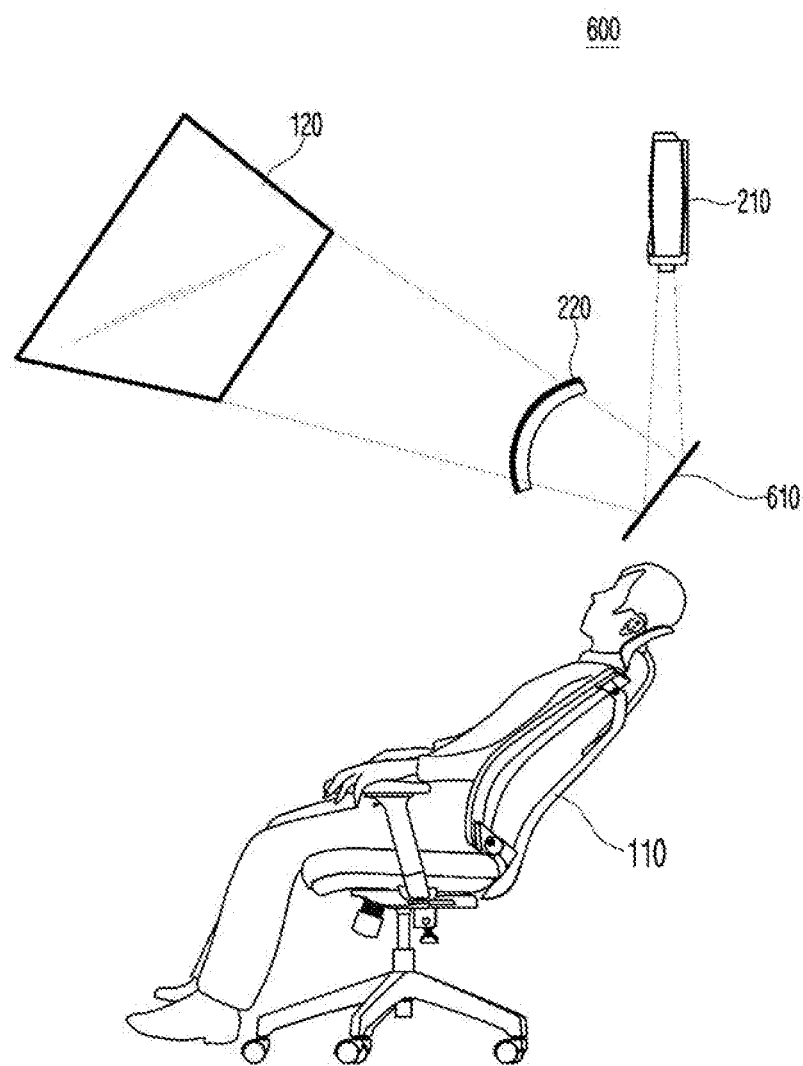
FIG. 6 is a block diagram illustrating a configuration of an immersive augmented reality head-up display apparatus according to an embodiment of the disclosure.

FIG. 6 is a block diagram illustrating a configuration of an immersive augmented reality head-up display apparatus according to an embodiment.

Referring to FIG. 6, according to an embodiment, an augmented reality device 600 may include the components of the augmented reality device 100 and, additionally, a holographic optical element (HOE) 610.

The HOE 610 is disposed to reduce the optical distance between the image output unit 210 and the optical system 220. The HOE 610 is disposed in the direction along which the augmented reality image output from the image output unit 210 is reflected to the optical system 220. The HOE 610 eliminates the need for the image output unit 210 being disposed in the direction along which the optical system 220 may reflect the augmented reality image to the user 110. In other words, the image output unit 210 may be disposed in various positions in connection with the HOE 610.

The HOE 610 may correct optical aberrations between the augmented reality image output from the image output unit 210 and the free-form curved surface of the HOE 610 or other image distortions simply without separate image processing, thus providing clearer, better-quality augmented reality images to the user.

The above-described embodiments are merely examples, and it will be appreciated by one of ordinary skill in the art various changes may be made thereto without departing from the scope of the disclosure. Accordingly, the embodiments set forth herein are provided for illustrative purposes, but not to limit the scope of the disclosure, and should be appreciated that the scope of the disclosure is not limited by the embodiments. The scope of the disclosure should be construed by the following claims, and all technical spirits within equivalents thereof should be interpreted to belong to the scope of the disclosure.

What is claimed is:

1. An augmented reality device, comprising:
an image output unit disposed at a preset angle from a horizontal direction to output an augmented reality image of a preset polarization direction;
a polarization reflection film reflecting light of the preset polarization direction and transmitting other light than the light of the preset polarization direction; and
an optical component disposed on a light path of an image output from the image output unit, the optical component having a preset refractive index and a preset shape, wherein the polarization reflection film is applied on a first surface of the optical component which is positioned farther away from the image output unit so that real-world light with a non-polarization direction strike the polarization reflection film so that light rays with the preset polarization direction are reflected while light rays with the other polarization directions pass through the polarization reflection film, and the augmented reality image with the preset polarization direction is fully reflected by the polarization reflection film, wherein
the polarization reflection film reflects a light component with the preset polarization direction of external light entering the optical component from an outside of the augmented reality device and transmits remaining light components of the external light to a user's eye, wherein
the optical component applied with the polarization reflection film is disposed at an angle at which the augmented reality image on the light path is reflected by the polarization reflection film to the user's eye, and
wherein the optical component changes the light path so that the user who cannot wholly recognize the real-world light or the augmented reality image can wholly recognize the real-world light or the augmented reality image and the optical component is implemented as a lens of glasses that the user actually wears or a lens with the same optical power as the lens of the glasses, thereby allowing the user to watch augmented reality images with wearing the glasses or to watch augmented reality images without wearing the glasses.

2. The augmented reality device of claim 1, wherein the polarization reflection film is disposed at an angle at which the reflected light is incident to the user's eye.

3. The augmented reality device of claim 1, wherein the augmented reality image output from the image output unit is reflected by the polarization reflection film to the user's eye.

4. The augmented reality device of claim 1, wherein light emitted towards the first surface of the optical component is incident to the polarization reflection film, and at least part of the light with other polarization directions than the preset polarization direction passes through the polarization reflection film and the optical component to the user's eye.

5. An augmented reality device, comprising:
an image output unit disposed at a preset angle from a horizontal direction to output an augmented reality image of a preset polarization direction;
a holographic optical element reflecting light emitted from the image output unit;
a polarization reflection film reflecting light of the preset polarization direction and transmitting other light than the light of the preset polarization direction; and
an optical component disposed on a light path of an image reflected by the holographic optical element, the optical component having a preset refractive index and a preset shape, wherein the polarization reflection film is applied on a first surface of the optical component which is positioned farther away from the image output unit so that real-world light with a non-polarization direction strike the polarization reflection film so that light rays with the preset polarization direction are reflected while light rays with the other polarization directions pass through the polarization reflection film, and the augmented reality image with the preset polarization direction is fully reflected by the polarization reflection film, wherein
the polarization reflection film reflects a light component with the preset polarization direction of external light entering the optical component from an outside of the augmented reality device and transmits remaining light components of the external light to a user's eye, wherein
the optical component applied with the polarization reflection film is disposed at an angle at which the augmented reality image on the light path is reflected by the polarization reflection film to the user's eye, and
wherein the optical component changes the light path so that the user who cannot wholly recognize the real-world light or the augmented reality image can wholly recognize the real-world light or the augmented reality image and the optical component is implemented as a lens of glasses that the user actually wears or a lens with the same optical power as the lens of the glasses, thereby allowing the user to watch augmented reality images with wearing the glasses or to watch augmented reality images without wearing the glasses.

6. The augmented reality device of claim 5, wherein the polarization reflection film is disposed at an angle at which the reflected light is incident to the user's eye.

7. The augmented reality device of claim 5, wherein the augmented reality image output from the image output unit is reflected by the polarization reflection film to the user's eye.

8. The augmented reality device of claim 5, wherein light emitted towards the first surface of the optical component is incident to the polarization reflection film, and at least part of the light with other polarization directions than the preset polarization direction passes through the polarization reflection film and the optical component to the user's eye.

9. An augmented reality (AR) device, comprising:
an image output unit disposed at a preset angle from a horizontal direction to output an AR image only having a predetermined polarization direction;
a lens having a surface; and
a polarizing film integrally formed on the surface of the lens, wherein the polarizing film fully reflects light or images having the predetermined polarization direction and fully transmits light or images having other polarization directions than the predetermined polarization direction so that real-world light with a non-polarization direction strike the polarization reflection film so that light rays with the preset polarization direction are reflected while light rays with the other polarization directions pass through the polarization reflection film, and the augmented reality image with the preset polarization direction is fully reflected by the polarization reflection film, and wherein the lens changes the light path so that the user who cannot wholly recognize the real-world light or the augmented reality image can wholly recognize the real-world light or the augmented reality image and the optical component is implemented as a lens of glasses that the user actually wears or a lens with the same optical power as the lens of the glasses, thereby allowing the user to watch augmented reality images with wearing the glasses or to watch augmented reality images without wearing the glasses.

\* \* \* \* \*